United States Patent Office 3,138,586
Patented June 23, 1964

3,138,586
2-CYCLOALKYLAMINO DERIVATIVES OF
3H-1,4-BENZODIAZEPINES
Heinz M. Wuest, Upper Montclair, N.J., assignor to
Warner-Lambert Pharmaceutical Company, Morris
Plains, N.Y., a corporation of Delaware
No Drawing. Filed Apr. 9, 1962, Ser. No. 204,301
6 Claims. (Cl. 260—239)

This invention relates to novel compounds having a 1,4-benzodiazepine-2-cycloalkylamino-4-oxide and 1,4-benzodiazepine-2-cycloalkylalkylamino-4-oxide structure, to a process for the production of such compounds and to novel intermediates useful in the synthesis of such compounds.

The compounds of this invention may be represented by the following structural formula

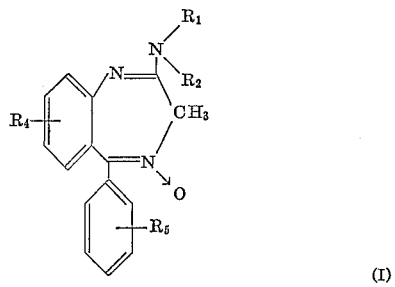

(I)

where $R_1$ represents hydrogen or a lower alkyl group, $R_2$ represents a cycloparaffin radical such as cyclopropyl, cyclopropylmethyl, cyclobutyl or cyclopentyl and $R_4$ and $R_5$ represent hydrogen, halogen, alkyl and alkoxy.

The compounds of the structure represented by Formula I form salts with acids such as mineral acids, for example, the halogen acids, sulfuric acid, nitric acid and the like, and the pharmaceutically acceptable, non-toxic salts of these compounds are also included within the scope of this invention.

The compounds of the structure represented by Formula I above may be synthesized by reacting an intermediate compound represented by the following structural formula

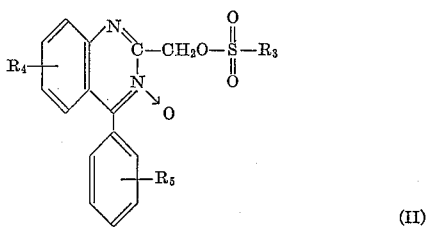

(II)

where $R_3$ represents an alkyl group such as methyl, ethyl or propyl or an aryl group such as phenyl or tolyl and $R_4$ and $R_5$ are hydrogen, halogen, alkyl and alkoxy, as described above, with an amine such as cyclopropylamine, cyclopropylmethylamine, cyclobutylamine or cyclopentylamine whereby a structural rearrangement occurs and the quinazoline ring of the compounds of the Formula II is enlarged, thus resulting in the formation of the 1,4-benzodiazepine structure of (I).

The method employed for synthesizing the compounds of the structure under Formula II described above is also a feature of this invention. The reaction involved may be, for example, represented as follows:

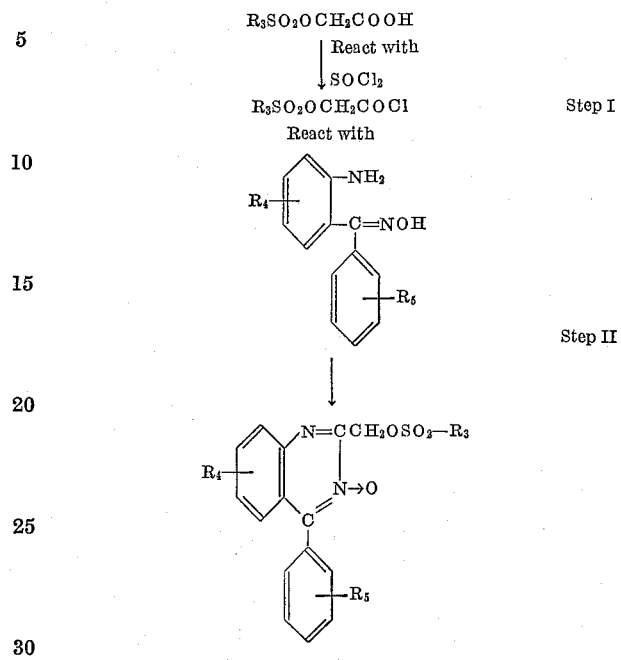

In the above reaction, the substituent $R_3$ represents an alkyl group such as methyl, ethyl or propyl or an aryl group such as phenyl or tolyl.

The preparation of the desired intermediate employed in Step I of this novel process is obtained by refluxing an alkyl or aryl sulfonyl oxyacetic acid of the formula

where $R_3$ is an alkyl or aryl radical at about 70° C. to 80° C. with an excess of thionyl chloride to form the corresponding substituted acetyl chloride:

The substituted acetyl chloride thus obtained is then employed, for instance, in Step II of the process which comprises adding said alkyl or aryl sulfonyl oxyacetyl chloride simultaneously with an aqueous solution of 4 N sodium hydroxide to a solution in dioxane of the 2-aminobenzophenone oximes of the formula

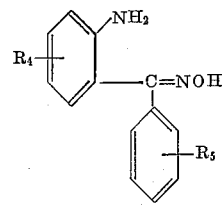

The reaction which takes place results in substituted acetanilides which may be cyclized with acid to form 2-alkylsulfonyloxymethyl-4-phenyl-quinazoline-3-oxides or 2-arylsulfonyloxymethyl-4-phenyl-quinazoline-3-oxides of the formula

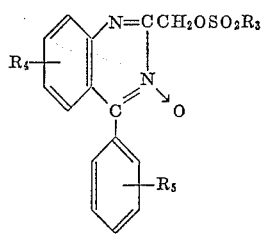

where $R_3$, $R_4$ and $R_5$ are as described.

The mesyloxyacetic acid and its corresponding acid chloride employed as the starting intermediates in the above process are novel compounds and methods for their preparation are described in my copending application entitled "Alkyl Sulfonyl Oxyacetic Acids" filed concurrently herewith.

It has previously been known, as brought out in U.S. Patent No. 2,893,992, that 2-halomethyl-4-phenyl-6-chloroquinazoline-3-oxides react with primary aliphatic amines and the ring enlargement which results produces 1,4-benzodiazepine-4-oxides. It has now been found that cycloalkylamines react with quinazoline-3-oxides such as the 6-chloro-4-phenyl-2-mesyloxymethylquinazoline-3-oxide with ring enlargement to form novel compounds of this invention such as 2-cycloalkylamino-7-chloro-5-phenyl-1,4-benzodiazepine-4-oxide. These novel compounds have strong sedative properties. Thus, for example, 7-chloro-2-cyclopropylamino-5-phenyl-3H-1,4-benzodiazepine-4-oxide can be obtained by reacting an alcoholic solution of cyclopropylamine with 6-chloro-4-phenyl-2-mesyloxymethylquinazoline-3-oxide.

The substitution in the 2-amino group of these 1,4-benzodiazepine-4-oxides by a cycloalkyl group produces compounds which not only have higher sedative action than the corresponding unsubstituted amino compound but these cycloalkylamine compounds also exhibit lower toxicity. In addition, the 2-cycloalkyl derivatives of this invention are highly specific in their sedative action and it has been observed that the ataxia and hypnosis which normally accompany the administration of the known 1,4-benzodiazepine-4-oxides are greatly reduced.

Furthermore, when the oxide in the 4-position of the novel 2-cycloalkyl derivatives of this invention is reduced, the pharmacological activity is increased, whereas, reducing the 4-oxide in 7-chloro-2-methylamino-5-phenyl-3H-1,4-benzodiazepine-4-oxide decreases activity.

In order further to illustrate this invention but without being limited thereto, the following examples are given.

*Example 1*

A mixture of 68.4 g. of mesyloxyacetic acid and 120 g. of thionyl chloride is refluxed at 70° C.–80° C. for three hours. At the conclusion of this period, the excess thionyl chloride is removed in vacuo, the reaction product, mesyloxyacetyl chloride remaining in the residue. The residue of mesyloxyacetyl chloride is then added simultaneously with aqueous 4 N sodium hydroxide solution to an agitated solution of 92.0 g. of 2-amino-5-chlorobenzophenone oxime in 560 ml. of dioxane. The reaction mixture is cooled in an ice bath, the addition being made at such a rate that the temperature stays below 17° C. and the pH of the reaction mixture between 7.0–7.3. After the addition is complete, the reaction mixture is stirred for 90 minutes at pH 7.0 and then the pH is adjusted to 5 with an aqueous solution of 1 N hydrochloric acid. The reaction mixture is then extracted into ether and the ethereal solution is washed five times with water, twice with a 5% solution of sodium bicarbonate and twice more with water. The ether is then evaporated, and a crude residue of the reaction product 2-mesyloxyacetamido-5-chlorobenzophenone oxime is obtained as a viscous, red oil.

The crude 2-mesyloxyacetamido-5-chloro-benzophenone oxime is dissolved in a mixture of 2500 ml. of glacial acetic acid and 54.1 g. of concentrated sulfuric acid and the resulting solution is then warmed to 50° C. and allowed to cool for 12–16 hours to a temperature of 25° C.–27° C. The solution is then combined with 4 litres of water and ether is added to extract the reaction product, 2-mesyloxymethyl-4-phenyl-6-chloroquinazoline-3-oxide from the aqueous mixture. The reaction product, 2-mesyloxymethyl-4-phenyl-6-chloroquinazoline-3-oxide readily crystallizes out of the ethereal solution. Upon evaporation of the ether, the crude dried product melts at 155° C.–156° C. Further recrystallization from a mixture containing 600 ml. ethanol and 1500 ml. of tetrahydrofuran yields purified 2-mesyloxymethyl-4-phenyl-6-chloroquinazoline-3-oxide which melts at 172.5° C.

*Example 2*

A mixture of 2.00 g. of mesyloxyacetic acid and 5.8 g. of thionyl chloride are refluxed together at 70° C.–80° C. for 90 minutes and the excess thionyl chloride is removed in vacuo. The residue contains the reaction product mesyloxyacetyl chloride. The latter is dissolved in a solution of 2.83 g. of 2-amino-5-chloro-benzophenone oxime in 16.5 ml. of acetic acid and 2.25 g. of concentrated sulfuric acid. The reaction mixture obtained is then warmed to 50° C. and allowed to cool gradually over a period of 16–18 hours. The acetic acid is then removed in vacuo and the residue which contains 2-mesyloxymethyl-4-phenyl-6-chloroquinazoline-3-oxide is dissolved in methylene chloride and washed with cold aqueous sodium carbonate and dried. The solvent is removed in vacuo and the amorphous residue is then triturated with ethanol to yield crystalline 2-mesyloxymethyl-4-phenyl-6-chloro-quinazoline-3-oxide which melts at 164° C.–167° C.

*Example 3*

To a solution of 5.9 g. of methylamine in 29.5 ml. of methanol is added 2 g. of 2-mesyloxymethyl-4-phenyl-6-chloroquinazoline-3-oxide and the resulting thick paste is allowed to stand for 12–18 hours at a temperature of 25° C.–27° C. The 7-chloro-2-methylamino-5-phenyl-3H-1,4-benzodiazepine-4-oxide formed is removed by filtration, and the mother liquor concentrated further to yield a second crop. The combined products are then recrystallized from methanol. The purified compound melts at 238.5° C.–240.5° C.

*Example 4*

To a solution of 4.70 g. of cyclopropylamine in 3.62 ml. of methanol is added 2.00 g. of 2-mesyloxymethyl-4-phenyl-6-chloroquinazoline-3-oxide and the mixture is maintained at –5° C. to 0° C. for 16–18 hours. A white crystalline precipitate of 7-chloro-2-cyclopropylamino-5-phenyl-3H-1,4-benzodiazepine-4-oxide is formed which melts at 222° C.–232° C. The compound is filtered off and recrystallized from methanol, the recrystallized product melting at 248° C.–251° C.

*Example 5*

To a solution of 17.6 g. of cyclopropylmethylamine in 13.4 ml. of methanol is added 6.0 g. of 2-mesyloxymethyl-4-phenyl-6-chloroquinazoline-3-oxide and the mixture is maintained at –5° C. to 0° C. for 16–18 hours. The white crystalline precipitate of 7-chloro-2-cyclopropylmethylamino-5-phenyl-3H-1,4-benzodiazepine-4-oxide which is obtained melts at 223.5° C.–228° C. To the filtrate an additional 6.00 g. of 2-mesyloxymethyl-4-phenyl-6-chloroquinazoline-3-oxide is added and a second crop of the benzodiazepine derivative is obtained on completion of the reaction. The second crop is removed by filtration and combined with the first crop. The combined crops are recrystallized from methanol to give purified 7-chloro-2-cyclopropylmethylamino-5-phenyl-3H-1,4-benzodiazepine-4-oxide which melts at 238° C.–239° C.

Example 6

To a solution of cyclopropylmethylamine in 20 ml. of methanol cooled by means of an ice bath is added, with stirring, 3.75 g. of 6-chloro-4-phenyl-2-chloromethyl-quinazoline-3-oxide. After several hours, the reaction yields 7 - chloro-5-phenyl-2-cyclopropylmethylamino-3H-1,4-benzodiazepine-4-oxide, which melts at 248° C.–250° C. The mother liquor is filtered off and an additional 3.2 g. of the quinazoline compound is added which, after reaction, yields a second crop of 7-chloro-5-phenyl-2-cyclopropylmethylamino-3H-1,4 - benzodiazepine - 4 - oxide which is also removed from the mother liquor by filtration. The two crops are then combined and recrystallized from n-propanol. The recrystallized material melts at 250° C.–251° C.

Example 7

To an ice-cooled solution of 21.9 g. of cyclopropylamine in 16.9 ml. of methanol is added 7.84 g. of 2-chloromethyl-4-phenyl-6-chloroquinazoline-3-oxide and the mixture is stirred for two hours in an ice bath. The compound 7-chloro-2-cyclopropylamino-5-phenyl-3H-1,4-benzodiazepine-4-oxide crystallizes out of the mixture and is removed by filtration. The crude compound, after washing with methanol, melts at 247° C.–251° C. To the filtrate is added an additional 7.84 g. of 2-chloromethyl-4-phenyl-6-chloroquinazoline and reaction yields a second crop of the above benzodiazepine derivative. The second crop is recovered in the same way as the first one and the combined crops are recrystallized from methanol. The recrystallized 7-chloro-2-cyclopropylamino-5-phenyl-3H-1,4-benzodiazepine-4-oxide melts at 246° C.–248.5° C.

Example 8

To a stirred solution of 3.9 g. of cyclobutylamine in 3 ml. of methanol is added 1.14 g. of 6-chloro-4-phenyl-2-chloromethylquinazoline - 3 - oxide. The mixture is stirred in an ice bath for several hours and then maintained at 4° C.–10° C. for 16–18 hours. The reaction product, 7-chloro-5-phenyl-2-cyclobutylamino-3H-1,4-benzodiazepine-4-oxide crystallizes out of solution. The product is removed by filtration, washed with methanol and dried. The crude product melts at 274° C.–276° C. To the methanol washings and the filtrate, an additional 1.03 g. of quinazoline is added to yield a second crop. The second crop is then combined with the first crop, digested with hot ethanol and dried. The dried compound melts at 265° C.

Example 9

To a solution of 3.6 g. of 7-chloro-2-cyclopropylamino-5-phenyl-3H-1,4-benzodiazepine-4-oxide in 63.5 ml. of chloroform is added 12.6 g. of phosphorus trichloride. The resulting solution is refluxed at 50° C.–60° C. for 60–70 minutes. At the conclusion of refluxing, the solvent is evaporated in vacuo and the residue is dissolved in 30 ml. of methylene chloride and shaken with ice and a 50% aqueous solution of sodium hydroxide. The resulting mixture is extracted with methylene chloride. The methylene chloride extract containing the reaction product 7-chloro-2-cyclopropylamino - 5 - phenyl-3H-1,4-benzodiazepine is obtained by evaporating methylene chloride in vacuo. The reaction product after recrystallization from acetone melts at 226.5° C.–229° C.

Example 10

To a solution of 6.16 g. of 7-chloro-2-cyclopropylmethylamino-5-phenyl-3H-1,4-benzodiazepine-4-oxide in 82 ml. of chloroform is added 16.3 g. of phosphorous trichloride and the resulting solution is refluxed at 50° C.–60° C. for one hour. At the conclusion of refluxing, the solvent is evaporated in vacuo, and the residue is dissolved in 30 ml. of methylene chloride and shaken with ice and a 50% aqueous solution of sodium hydroxide. The reaction product, 7-chloro-2-cyclopropylmethylamino-5-phenyl-3H-1,4-benzodiazepine precipitates out of the solution and is removed by filtration. The crude compound melts at 187.5° C.–189° C. and after recrystallization from 30 ml. of ethanol, it melts at 188° C.–188.5° C.

It is understood that the above detailed examples are given merely by way of illustration and that many variations may be made therein without departing from the spirit of this invention.

Having described my invention, what I desire to secure by Letters Patent is:

1. A compound selected from the group consisting of those represented by the formula

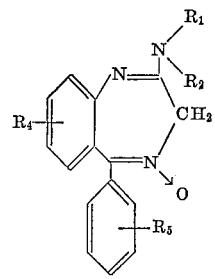

wherein $R_1$ represents hydrogen, $R_2$ is a cycloparaffin group having 3 to 4 carbon atoms and $R_4$ and $R_5$ represent a member of the group consisting of hydrogen and, halogen, and acid addition salts thereof with halogen acids, sulfuric acid and nitric acid.

2. 7-chloro - 2 - cyclopropylamino - 5 - phenyl-3H-1,4-benzodiazepine-4-oxide.

3. 7-chloro-2-cyclopropylmethylamino - 5 - phenyl-3H-1,4-benzodiazepine-4-oxide.

4. A compound selected from the group consisting of those represented by the formula

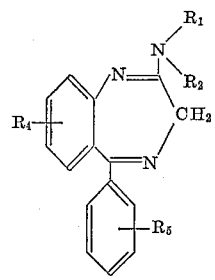

wherein $R_1$ represents hydrogen, $R_2$ is a cycloparaffin group having 3 to 4 carbon atoms and $R_4$ and $R_5$ represent a member of the group consisting of hydrogen and, halogen, and acid addition salts thereof with halogen acids, sulfuric acid, and nitric acid.

5. 7-chloro - 2 - cyclopropylamino - 5 - phenyl-3H-1,4-benzodiazepine.

6. 7-chloro - 2 - cyclopropylmethylamino - 5 - phenyl-3H-1,4-benzodiazepine.

References Cited in the file of this patent

UNITED STATES PATENTS

| | | |
|---|---|---|
| 2,044,956 | Sheibley | June 23, 1936 |
| 2,893,992 | Sternbach | July 7, 1959 |
| 2,987,517 | Martin et al. | June 6, 1961 |
| 2,992,221 | Petersen et al. | July 11, 1961 |
| 2,993,046 | Bortnick et al. | July 18, 1961 |
| 3,051,701 | Reeder et al. | Aug. 28, 1962 |

OTHER REFERENCES

Groggins: Unit Processes in Organic Synthesis, 4th Edition 1952, pp. 800–801.

Wagner et al.: Synthetic Organic Chemistry, 1953, pp. 666–68.

Noller: Textbook of Organic Chemistry, Second Edition, 1958, page 358.

Sternbach et al.: Jour. Org. Chem., vol. 26, pp. 4936–41 (1961).